United States Patent
Brown et al.

(10) Patent No.: US 9,740,389 B2
(45) Date of Patent: *Aug. 22, 2017

(54) DEVICE, SYSTEM AND METHOD FOR PROCESSING CHARACTER DATA

(71) Applicant: BlackBerry Limited, Waterloo (CA)

(72) Inventors: Michael Stephen Brown, Kitchener (CA); Terrill Mark Dent, Waterloo (CA); Dan Zacharias Gärdenfors, Malmo (SE); Jason Tyler Griffin, Kitchener (CA)

(73) Assignee: BlackBerry Limited, Waterloo, Ontario (CA)

(*) Notice: Subject to any disclaimer, the term of this patent is extended or adjusted under 35 U.S.C. 154(b) by 376 days.

This patent is subject to a terminal disclaimer.

(21) Appl. No.: 13/869,612

(22) Filed: Apr. 24, 2013

(65) Prior Publication Data

US 2014/0325382 A1    Oct. 30, 2014

(51) Int. Cl.

| G06F 15/16 | (2006.01) |
|---|---|
| G06F 3/0486 | (2013.01) |
| G06F 3/01 | (2006.01) |
| G06F 3/0481 | (2013.01) |
| H04L 29/08 | (2006.01) |
| G06F 3/0488 | (2013.01) |
| G06F 1/16 | (2006.01) |
| H04W 4/00 | (2009.01) |

(52) U.S. Cl.
CPC .......... *G06F 3/0486* (2013.01); *G06F 1/1626* (2013.01); *G06F 3/017* (2013.01); *G06F 3/0488* (2013.01); *G06F 3/04817* (2013.01); *G06F 3/04883* (2013.01); *H04L 67/06* (2013.01); *H04W 4/008* (2013.01)

(58) Field of Classification Search
CPC ... H04L 65/403; H04L 67/10; H04L 12/1813; H04L 51/046; H04L 67/104; H04L 67/1095
USPC ........ 709/204, 205, 227, 228, 229, 230, 231
See application file for complete search history.

(56) References Cited

U.S. PATENT DOCUMENTS

| 5,508,713 A * | 4/1996 | Okouchi ............... G06F 3/0481 345/2.2 |
|---|---|---|
| 6,191,807 B1 * | 2/2001 | Hamada .................. H04N 7/15 348/14.03 |
| 6,463,460 B1 * | 10/2002 | Simonoff ............... G06F 3/033 709/203 |
| 6,545,669 B1 * | 4/2003 | Kinawi ................. G06F 3/0486 345/1.1 |

(Continued)

FOREIGN PATENT DOCUMENTS

WO     2008/125925 A1    10/2008

OTHER PUBLICATIONS

Extended European Search Report from related European Patent Application No. 13165251.3 dated Sep. 5, 2013; 6 pages.

*Primary Examiner* — Edward Kim
(74) *Attorney, Agent, or Firm* — Thomas Grzesik; Fleit Gibbons Gutman Bongini & Bianco P.L.

(57) ABSTRACT

A method is described. The method comprising: receiving character data from the remote device in response to a user applying the character data to a displayed target; and supplying the character data to one of a plurality of components executable on a processor of a device based on one or more characters in the character data. A device is also described.

38 Claims, 7 Drawing Sheets

(56) References Cited

U.S. PATENT DOCUMENTS

| | | | |
|---|---|---|---|
| 7,930,347 B2* | 4/2011 | Maxwell | G06F 17/30017 709/202 |
| 7,953,112 B2* | 5/2011 | Hindus | H04L 29/06 370/465 |
| 8,346,864 B1* | 1/2013 | Amidon | H04L 65/1069 709/204 |
| 8,565,741 B2* | 10/2013 | Yang | G06F 3/0481 455/414.1 |
| 2002/0143878 A1* | 10/2002 | Birnbaum | G06F 17/30899 709/205 |
| 2002/0152271 A1* | 10/2002 | Chafle | G06F 17/30168 709/204 |
| 2005/0093868 A1 | 5/2005 | Hinckley | |
| 2005/0262535 A1* | 11/2005 | Uchida | H04N 7/163 725/80 |
| 2007/0264976 A1* | 11/2007 | Lessing | H04W 88/06 455/414.1 |
| 2008/0212490 A1* | 9/2008 | Greve | H04L 12/58 370/254 |
| 2008/0216125 A1* | 9/2008 | Li | H04N 13/0239 725/62 |
| 2009/0140986 A1* | 6/2009 | Karkkainen | G06F 3/0486 345/173 |
| 2012/0284638 A1* | 11/2012 | Cutler | G06Q 10/00 715/751 |
| 2013/0174191 A1* | 7/2013 | Thompson, Jr. | G06Q 30/0207 725/23 |
| 2014/0025744 A1* | 1/2014 | Kim | G06F 3/1454 709/204 |

* cited by examiner

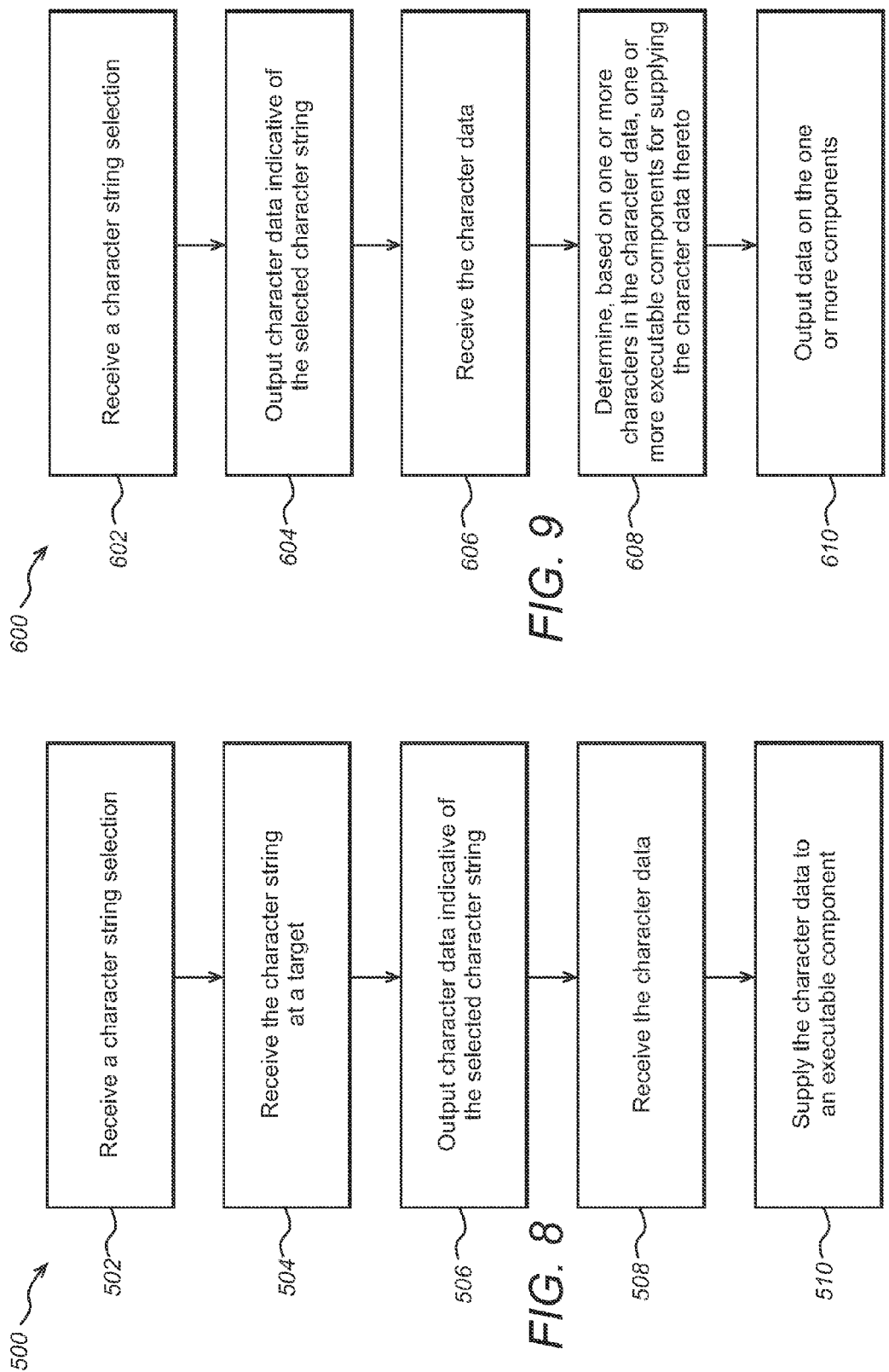

DEVICE, SYSTEM AND METHOD FOR PROCESSING CHARACTER DATA

TECHNICAL FIELD

The present disclosure relates to a method, device and system for processing character data.

BACKGROUND

Moving files between two devices having an established connection can be time consuming and involve a lot of steps. This may involve navigating an unknown file system. Furthermore, users may want to share content, in addition to files, between devices, e.g., content of a message received on a mobile device, but users do not want to go through multiple steps to achieve this.

BRIEF DESCRIPTION OF THE DRAWINGS

The present disclosure can be understood with reference to the description of the embodiments set out below, in conjunction with the appended drawings in which:

FIG. 8 is a flow diagram showing a method for receiving character data; and

FIG. 9 is a flow diagram showing a method for determining possible components executable on the processor for supplying character data thereto.

DESCRIPTION

Figure 1:
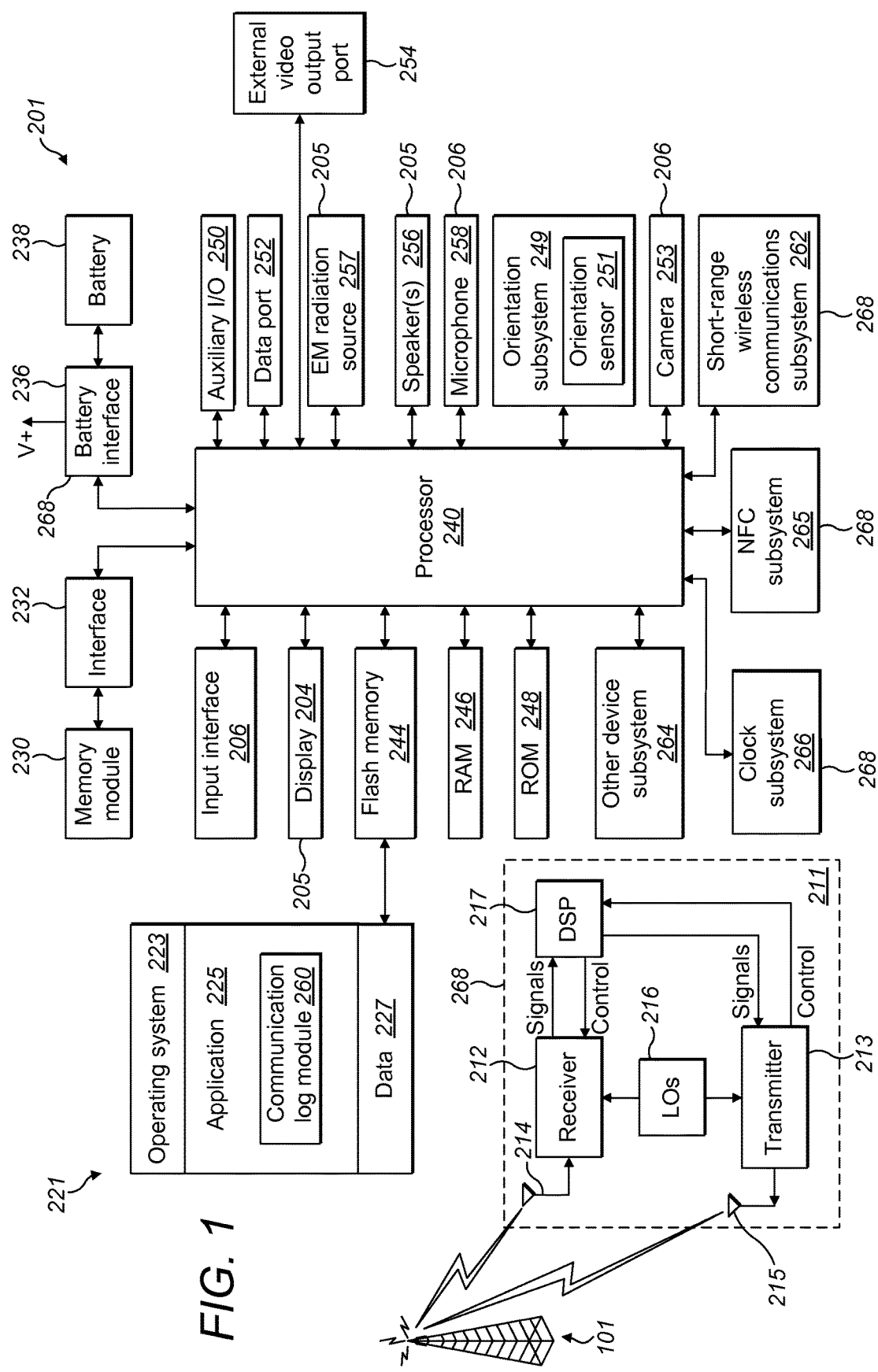
FIG. 1 is a schematic diagram illustrating components of an electronic device usable by a user in some embodiments.

This disclosure below is a description of one or more exemplary embodiments which are not intended to be limiting on the scope of the appended claims.

In a first aspect there is provided a method for a device in communication with a remote device, the method comprising: receiving character data from the remote device in response to a user applying the character data to a displayed target; and supplying the character data to one of a plurality of components executable on a processor of the device based on one or more characters in the character data.

The method may comprise the step of identifying a component compatible with the character data based on the characters in the character data and supplying the character data to the identified component.

The method may comprise the step of generating a prompt to update the appearance of the target based on characters in the character data.

The method may comprise the step of generating a prompt to update the appearance of the target based on the one component.

The method may comprise the step of identifying one or more components compatible with the character data based on the characters in the character data and generating a selectable list of components for display on the remote device.

The method may comprise the step of receiving a user selection based on the generated list and to supply the character data to the selected component.

The method may comprise the step of prioritizing the list of components based on one or more characters in the character data.

The method may comprise the step of launching a component upon receipt of the character data.

The character data may comprise one or more of a date, an address, an email address, a URL, a contact, contact details and plain text.

The method may comprise the step of outputting data to the remote device for use in generating the target at the remote device.

The method may comprise the step of generating the data in response to receiving a user gesture.

In a second aspect there is provided a method for a device in communication with a remote device, the method comprising: generating data pertaining to a target for display; receiving character data in response to a user applying the character data to the target; and outputting the character data to the remote device.

Applying the character data to the target may comprise copying and pasting the character data to the target.

Applying the character data to the target may comprise dragging and dropping a selected character data to the target.

The method may comprise the step of updating the appearance of the target based on a prompt received from the remote device.

The method may comprise the step of outputting the character data to the remote device in response to a user selecting the character data.

The method may comprise the step of outputting the character data to the remote device in response to a user moving selected character data to within a predetermined distance of the target.

In a third aspect, there is provided a device comprising: a processor configured to communicate with a remote device, the processor being further configured to: receive character data from the remote device in response to a user applying the character data to a displayed target; and supply the character data to one of a plurality of components executable on the processor based on one or more characters in the character data.

The processor may be configured to identify a component compatible with the character data based on the characters in the character data and to supply the character data to the identified component.

The processor may be configured to generate a prompt to update the appearance of the target based on characters in the character data.

The processor may be configured to generate a prompt to update the appearance of the target based on the one component.

The processor may be configured to identify one or more components compatible with the character data based on the characters in the character data and to generate a selectable list of components for display on the remote device.

The processor may be configured to receive a user selection based on the generated list and to supply the character data to the selected component.

The processor may be configured to prioritize the list of components based on one or more characters in the character data.

The processor may be configured to launch a component upon receipt of the character data.

The character data may comprise one or more of a date, an address, an email address, a URL, a contact, contact details and plain text.

The processor may be configured to output data to the remote device for use in generating the target at the remote device.

The processor may be configured to generate the data in response to receiving a user gesture.

In a fourth aspect, there is provided a device comprising: a processor configured to communicate with a remote device, the processor being further configured to: generate data pertaining to a target for display; receive character data in response to a user applying the character data to the target; and output the character data to the remote device.

Applying the character data to the target may comprise copying and pasting the character data to the target.

Applying the character data to the target may comprise dragging and dropping a selected character data to the target.

The processor may be configured to update the appearance of the target based on a prompt received from the remote device.

The processor may be configured to output the character data to the remote device in response to a user selecting the character data.

The processor may be configured to output the character data to the remote device in response to a user moving selected character data to within a predetermined distance of the target.

In a fifth aspect, there is provided a computer-readable medium comprising executable instructions which, when executed, cause a processor to perform one or more of the above methods. The executable instructions may be computer-executable instructions. A device may be configured to receive the executable instructions from the computer-readable medium, and/or comprise the executable instructions, and be configured to execute the executable instructions.

In a sixth aspect, there is provided a device comprising a processing circuit configured to perform one or more of the above methods. The processing circuit may comprise one or more discrete electronic components In a seventh aspect, there is provided a computer-readable medium comprising executable instructions which, when executed, cause a processor to perform a method comprising: receiving character data from a remote device in response to a user applying the character data to a displayed target; and supplying the character data to one of a plurality of components executable on a processor of a device based on one or more characters in the character data In an eighth aspect, there is provided a computer-readable medium comprising executable instructions which, when executed, cause a processor to perform a method comprising: generating data pertaining to a target for display; receiving character data in response to a user applying the character data to the target; and outputting the character data to a remote device.

In a ninth aspect, there is provided a device comprising a processing circuit configured to perform a method comprising: receiving character data from a remote device in response to a user applying the character data to a displayed target; and supplying the character data to one of a plurality of components executable on a processor of a device based on one or more characters in the character data.

In a tenth aspect, there is provided a device comprising a processing circuit configured to perform a method comprising: generating data pertaining to a target for display; receiving character data in response to a user applying the character data to the target; and outputting the character data to a remote device.

Reference is made to FIG. 1 which illustrates an electronic device 201 which is usable in accordance with the disclosure below. An electronic device 201 such as the electronic device 201 of FIG. 1 is configured to generate a user-controllable interface on a built-in display and/or on a remote, external display device, or on a built-in display and on a remote, external display device. In the context of this disclosure, the term "remote" means a display screen which is not built-in to the electronic device 201 with which the electronic device 201 communicates via a physical wired connection or via a wireless connection.

It will be appreciated that, in certain embodiments, some of the features, systems or subsystems of the electronic device 201 discussed below with reference to FIG. 1 may be omitted from electronic devices 201 which are intended to perform solely operations in relation to the generation and output of display data and the modification of media content output.

In one embodiment, the electronic device 201 is a communication device and, more particularly, may be a mobile or handheld device, such as a mobile or handheld communication device, for example having data and voice communication capabilities. It may also have the capability to communicate with other computer systems; for example, via a data link or network, such as a short-range radio frequency link, e.g. Bluetooth, or via a data network, which may be wireless and may be connected to the Internet. It will be appreciated that the electronic device 201 may take other forms, including any one of the forms listed below. Depending on the functionality provided by the electronic device 201, in certain embodiments, the electronic device 201 is a multiple-mode communication device configured for both data and voice communication, a mobile telephone, such as a smartphone, a wearable computer such as a watch, a tablet computer, a personal digital assistant (PDA), or a computer system such as a notebook, laptop or desktop system. The electronic device 201 may take other forms apart from those specifically listed above. The electronic device 201 may also be referred to as a mobile, handheld or portable communications device, a communication device, a mobile device and, in some cases, as a device. In the context of this disclosure, the term "mobile" means the device is of a size or weight which makes it readily portable by a single individual, e.g. of a weight less than 5, 4, 3, 2, 1, 0.5, 0.4, 0.3, 0.2 or 0.1 kilograms, or of a volume less than 15,000, 10,000, 5,000, 4,000, 3,000, 2,000, 1,000, 500, 400, 300, 200, 100, 90, 80, 70, 60, 50, 40, 30, 20, 10 or 5 cubic centimeters. As such, the device 201 may be portable in a bag, or clothing pocket.

The electronic device 201 includes a controller including a processor 240 (such as a microprocessor) which controls the operation of the electronic device 201. In certain electronic devices, more than one processor is provided, with each processor in communication with each other and configured to perform operations in parallel, so that they together control the overall operation of the electronic device. The processor 240 interacts with device subsystems, such as a wireless communication subsystem 211 for exchanging radio frequency signals with a wireless network 101 to perform communication functions. The processor 240 is communicably coupled with additional device subsystems including one or more output interfaces 205 (such as one or more of: a display 204, a speaker 256, electromagnetic (EM) radiation source 257), one or more input interfaces 206 (such as one or more of: a camera 253, microphone 258, keyboard (not shown), control buttons (not shown), a navigational input device (not shown), a touch-sensitive overlay (not shown)) associated with a touchscreen 204, an orientation subsystem 249, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), an external video output port 254, a near field communications (NFC) subsystem 265, a short-range communication subsystem 262, a clock subsystem 266, a battery interface 236, and other device subsystems generally designated as 264. Some of the subsystems shown in FIG. 1 perform communication-related functions, whereas other subsystems may provide "resident" or on-device functions.

The electronic device 201 stores data 227 in an erasable persistent memory, which in one embodiment is the flash memory 244. In various embodiments, the data 227 includes service data including information used by the electronic device 201 to establish and maintain communication with the wireless network 101. The data 227 may also include user application data such as email messages, address book and contact information, calendar and schedule information, notepad documents, presentation documents and information, word processor documents and information, spread sheet documents and information; desktop publishing documents and information, database files and information; image files, video files, audio files, internet web pages, and other commonly stored user information stored on the electronic device 201 by its user, and other data. The data may also include program application data such as functions, controls and interfaces from an application such as an email application, an address book application, a calendar application, a notepad application, a presentation application, a word processor application, a spread sheet application, a desktop publishing application, a database application, a media application such as a picture viewer, a video player or an audio player, and a web browser. The data 227 stored in the persistent memory (e.g. flash memory 244) of the electronic device 201 may be organized, at least partially, into one or more databases or data stores. The databases or data stores may contain data items of the same data type or associated with the same application. For example, email messages, contact records, and task items may be stored in individual databases within the device memory.

The electronic device 201 includes a clock subsystem or module 266 comprising a system clock configured to measure system time. In one embodiment, the system clock comprises its own alternate power source. The system clock provides an indicator of a current time value, the system time, represented as a year/month/day/hour/minute/second/milliseconds value. In other embodiments, the clock subsystem 266 additionally or alternatively provides an indicator of the current time value represented as a count of the number of ticks of known duration since a particular epoch.

The clock subsystem 266, the communication subsystem 211, the NFC subsystem, 265, the short-range wireless communications subsystem 262, and the battery interface 236 together form a status report subsystem 268 which is configured to provide an indicator of the operating status of the device.

The display 204 receives display data generated by the processor 240, such that the display 204 displays certain application data stored as a segment of the data 227 from the memory (any of the flash memory 244, random access memory (RAM) 246, read only memory (ROM) 248) in a predetermined way on display screen (not shown) of the display 204, according to the processing performed by the processor 240.

In certain embodiments, the external video output port 254 is integrated with the data port 252. The external video output port 254 is configured to connect the electronic device 201 via a wired connection (e.g. video graphics array (VGA), digital visual interface (DVI) or high definition multimedia interface (HDMI)) to an external (or remote) display device 290 which is separate and remote from the electronic device 201 and its display 204. The processor 240 outputs external display data generated by the processor 240 via the external video output port 254, such that the external display device 290 can display application data from the memory module in a predetermined way on an external display screen (not shown) of the external display device 290. The processor 240 may also communicate the external display data to the external display device 290 in a similar fashion over a wireless communications path.

At any given time, the display data and the external display data generated by the processor 240 may be identical or similar for a predetermined period of time, but may also differ for a predetermined period of time, with the processor 240 controlling whether the display data and the external display data are identical or differ based on input from one or more of the input interfaces 206. In this context, the word "identical" means that both sets of data comprise similar content so as to generate an identical or substantially similar display at substantially the same time on both the external display device 290 and the display 204. In this context, the word "differ" means that the external display data and display data are not identical; this is to say that these data may (but not necessarily) include identical elements of data, for example representative of the same application data, but the external display data and display data are not wholly identical. Hence, the display on both the external display device 290 and the display 204 are not wholly identical, although similar or identical individual items of content based on the application data may be displayed on both the external display device 290 and the display 204.

In at least some embodiments, the electronic device 201 includes a touchscreen which acts as both an input interface 206 (e.g. touch-sensitive overlay) and an output interface 205 (i.e. display). The touchscreen may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller.

The processor 240 is in communication with the memory and the touch-sensitive input interface 206 to detect user input via the input interface 206. The processor 240 then generates or updates display data comprising a display object for display by the display device 204 in accordance with the user input. The processor 240 then outputs the display data for display on the display device 204. In an embodiment, the user input may comprise a swipe gesture across the touchscreen interface 206.

In at least some embodiments, the touch-sensitive overlay has a touch-sensitive input surface which is larger than the display 204. For example, in at least some embodiments, the touch-sensitive overlay may extend overtop of a frame (not shown) which surrounds the display 204. In such embodiments, the frame (not shown) may be referred to as an active frame since it is capable of acting as an input interface 206. In at least some embodiments, the touch-sensitive overlay may extend to the sides of the electronic device 201.

The input interface 206 may also comprise the touchscreen, in which case the electronic device 201 may be referred to as a 'multi-touch device'. The input detected by the touchscreen interface may comprise any suitable user touch-based input. For example, the input may comprise a gesture input such as a tap, a multi-tap, a long press, a swipe or scroll or slide, a pan, a flick, a multi-swipe, a multi-finger tap, a multi-finger scroll or swipe, a pinch, a two-hand pinch, a spread, a two-hand spread, a rotation, a two-hand rotation, a slide and rotation, a multi-direction slide, a multi-finger slide and rotation, a multi-finger slide, etc. It will be appreciated that the gesture input may comprise a sequence of input elements or stages performed within a specified or predetermined time frame, for example, a three-tap gesture in which each tap comprises an element (or a sub-input, a phase or a stage) of the input and the three taps are performed within a time frame that enables the processor 240 to detect the taps as elements of a single input. Additionally or alternatively, an input may comprise removing a point of contact, e.g., a finger or stylus, from the touchscreen interface.

Many examples described herein refer to a gesture detected by a touch-sensitive display, but other methods of gesture detection may be used. For example, a gesture may be a generalized trajectory description characterized as a sequence of 3D points in time, and as such many different sensors may be utilized to detect such a gesture. The gesture may be performed by moving a portable electronic device or moving one or more body parts, such as fingers or thumbs as a 3D spatial gesture. For example, sensors, such as an accelerometer/gyroscope, or proximity sensors, or time-of-flight cameras may detect such gestures. Gesture recognition and detection techniques of this type are known.

An accelerometer or gyroscope may be utilized to detect 3D spatial gestures. A sequence of acceleration values may be detected in the different spatial dimensions as a function of time and constitute trajectory information that can be recognized as a gesture. For example, a quick flick and a tilt of the portable electronic device are examples of detectable gestures. A 3D spatial gesture includes a continuous movement, a sequence of movements, and a series of continuous movements or sequences of movements. Proximity sensors, optical sensors, and/or cameras may be utilized to detect 3D spatial gestures comprising motion of objects spaced from the device.

A gesture input is different to input of a command by manipulation of a control component presented on the screen because a gesture input can be performed at any location within the display screen (or a large area of the display screen) in contrast to a single contact point for a user finger or input stylus on a corresponding control element. In order to input a command using a control component, the user must contact the screen at a specific location corresponding to that component. For example, in order to change an output volume using a volume control, the user must select the volume control by touching the location at which the volume control is displayed and moving the displayed control element by a desired amount through movement of the user's finger across the screen. Such user input must therefore be precisely controlled in order to use control elements to input commands. Gesture-based inputs, on the other hand, do not require the same precise control as they are not tied to a specific location on the screen. Instead, a user wishing to, e.g., scroll through a list of media content can do so by performing a swipe gesture at any location within a media-player display.

As noted above, in some embodiments, the electronic device 201 includes a communication subsystem 211 which allows the electronic device 201 to communicate over a wireless network 101. The communication subsystem 211 includes a receiver 212, a transmitter 213, and associated components, such as one or more antenna elements 214 and 215, local oscillators (LOs) 216, and a processing module such as a digital signal processor (DSP) 217 which is in communication with the processor 240. The antenna elements 214 and 215 may be embedded or internal to the electronic device 201 and a single antenna may be shared by both receiver and transmitter. The particular design of the wireless communication subsystem 211 depends on the wireless network 101 in which electronic device 201 is intended to operate.

In at least some embodiments, the electronic device 201 communicates with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 214 through the wireless network 101 are input to the receiver 212, which may perform such common receiver functions as signal amplification, frequency down conversion, filtering, channel selection, etc., as well as analog-to-digital (ND) conversion. ND conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (D/A) conversion, frequency up conversion, filtering, amplification, and transmission to the wireless network 101 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

In some embodiments, the auxiliary input/output (I/O) subsystems 250 include an external communication link or interface; for example, an Ethernet connection. The electronic device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (touch feedback).

In some embodiments, the electronic device 201 also includes a removable memory module 230 (typically including flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory card interface 232 of the electronic device 201 in order to operate in conjunction with the wireless network 101.

The data port 252 may be used for synchronization with a user's host computer system (not shown). The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

In at least some embodiments, the electronic device 201 also includes a device orientation subsystem 249 including at least one orientation sensor 251 which is connected to the processor 240 and which is controlled by one or a combination of a monitoring circuit and operating software. The orientation sensor 251 detects the orientation of the device 201 or information from which the orientation of the device 201 can be determined, such as acceleration. In some embodiments, the orientation sensor 251 is an accelerometer, such as a three-axis accelerometer. An accelerometer is a sensor which converts acceleration from motion (e.g. movement of the device 201 or a portion thereof due to the strike force) and gravity which are detected by a sensing element into an electrical signal (producing a corresponding change in output). Accelerometers may be available in one, two or three axis configurations. Higher order axis configurations are also possible. Accelerometers may produce digital or analog output signals depending on the type of accelerometer.

An orientation sensor 251 may generate orientation data which specifies the orientation of the electronic device 201. The orientation data, in at least some embodiments, specifies the orientation of the device 201 relative to the gravitational field of the earth. Additionally or alternatively, the orientation sensor 251 may generate orientation data which specifies the orientation of the device relative to known locations or fixtures in a communication network.

In some embodiments, the orientation subsystem 249 includes other orientation sensors 251, instead of or in addition to accelerometers. For example, in various embodiments, the orientation subsystem 249 may include a gravity sensor, a gyroscope, a tilt sensor, an electronic compass or other suitable sensor, or combinations thereof. In some embodiments, the device orientation subsystem 249 may include two or more orientation sensors 251 such as an accelerometer and an electronic compass.

The electronic device 201, in at least some embodiments, includes a Near-Field Communication (NFC) subsystem 265. The NFC subsystem 265 is configured to communicate with other electronic devices 201 or tags, using an NFC communications protocol. NFC is a set of short-range wireless technologies which typically require a distance of 4 cm or less for communications. The NFC subsystem 265 may include an NFC chip and an NFC antenna. In such an embodiment, the orientation sensor 251 may generate data which specifies a distance between the electronic device 201 and an NFC transceiver.

The electronic device 201 includes a microphone or one or more speakers. In at least some embodiments, an electronic device 201 includes a plurality of speakers 256. For example, in some embodiments, the electronic device 201 includes two or more speakers 256. The two or more speakers 256 may, for example, be disposed in spaced relation to one another. That is, in at least some embodiments, the electronic device 201 may include a first speaker and a second speaker and the first speaker and the second speaker may be spatially separated from one another within the electronic device 201. In at least some embodiments, the display 204 may be disposed between the first speaker and the second speaker of the electronic device. In such embodiments, the first speaker may be located at one side of the display 204 and the second speaker may be located at another side of the display which is opposite the side of the display where the first speaker is located. For example, the first speaker may be disposed at a left side of the display and the second speaker may be disposed at a right side of the display.

In at least some embodiments, each speaker 256 is associated with a separate audio channel. The multiple speakers may, for example, be used to provide stereophonic sound (which may also be referred to as stereo).

The electronic device 201 may also include one or more cameras 253. The one or more cameras 253 may be capable of capturing images in the form of still photographs or motion video.

In at least some embodiments, the electronic device 201 includes a front facing camera 253. A front facing camera is a camera which is generally located on a front face of the electronic device 201. The front face is typically the face on which a display 204 is mounted. That is, the display 204 is configured to display content which may be viewed from a side of the electronic device 201 where the camera 253 is directed. The front facing camera 253 may be located anywhere on the front surface of the electronic device; for example, the camera 253 may be located above or below the display 204. The camera 253 may be a fixed position camera which is not movable relative to the display 204 of the electronic device 201 or the housing of the electronic device 201. In such embodiments, the direction of capture of the camera is always predictable relative to the display 204 or the housing. In at least some embodiments, the camera may be provided in a central location relative to the display 204 to facilitate image acquisition of a face.

In at least some embodiments, the electronic device 201 includes an electromagnetic (EM) radiation source 257. In at least some embodiments, the EM radiation source 257 is configured to emit electromagnetic radiation from the side of the electronic device which is associated with a camera 253 of that electronic device 201. For example, where the camera is a front facing camera 253, the electronic device 201 may be configured to emit electromagnetic radiation from the front face of the electronic device 201. That is, in at least some embodiments, the electromagnetic radiation source 257 is configured to emit radiation in a direction which may visible by the camera. That is, the camera 253 and the electromagnetic radiation source 257 may be disposed on the electronic device 201 so that electromagnetic radiation emitted by the electromagnetic radiation source 257 is visible in images detected by the camera.

In some embodiments, the electromagnetic radiation source 257 is an infrared (IR) radiation source which is configured to emit infrared radiation. In at least some embodiments, the electromagnetic radiation source 257 may be configured to emit radiation which is not part of the visible spectrum. The camera 253 may be a camera which is configured to capture radiation of the type emitted by the electromagnetic radiation source 257. Accordingly, in at least some embodiments, the camera 253 is configured to capture at least some electromagnetic radiation which is not in the visible spectrum.

In some embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to a host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer system for processing.

The electronic device 201 also includes a battery 238 as a power source, which is typically one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 includes a short-range communication subsystem 262 which provides for wireless communication between the electronic device 201 and other electronic devices 201. In at least some embodiments, the short-range communication subsystem 262 is a wireless bus protocol compliant communication mechanism such as a Bluetooth® communication module to provide for communication with similarly-enabled systems and devices.

Any one or more of the communication subsystem 211, the NFC subsystem 265 and the short-range wireless communications subsystem 262 serves as a "communication subsystem" which is configured to provide an indicator of an incoming message being received by the electronic device 201. The incoming message may be an email, a message received via a social networking website, an SMS (short message service) message, or a telephone call, for example.

The electronic device 201 is, in some embodiments, a mobile communication device which may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email messaging application and output to the display 204. A user of the electronic device 201 can compose data items, such as email messages; for example, using the input devices in conjunction with the display 204. These composed items may be transmitted through the communication subsystem 211 over the wireless network 101.

In the voice communication mode, the electronic device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the display screen 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 1, the software modules 221 include operating system software 223 and other software applications 225 such as a media player module 260. In the embodiment of FIG. 1, the media player module 260 is implemented as a stand-alone application 225. However, in other embodiments, the presentation module 260 could be implemented as part of the operating system 223 or other applications 225.

As discussed above, electronic devices 201 which are configured to perform operations in relation to a communications log may take a variety of forms. In at least some embodiments, one or more of the electronic devices which are configured to perform operations in relation to the presentation module 260 are a smart phone or a tablet computer.

Figure 2:
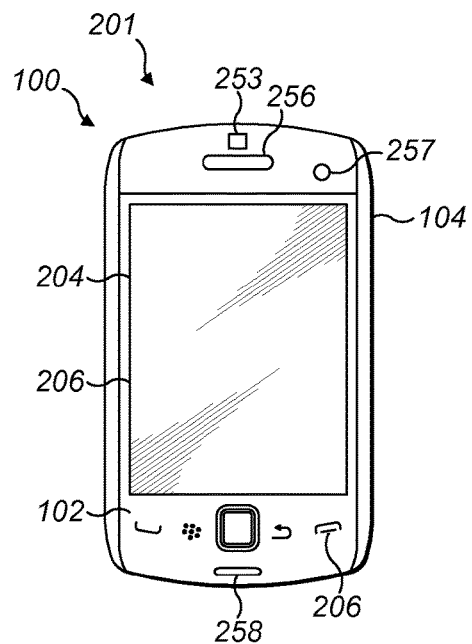
FIG. 2 is a plan view of the upper external side of one electronic device usable by an end-user in some embodiments.

Referring now to FIG. 2, a front view of an electronic device 201 which in one example may be a mobile device 100 is illustrated. The mobile device 100 (e.g. smart phone) is a phone which offers more advanced computing capability than a basic non-smartphone cellular phone. For example, the mobile device 100 may have the ability to run third party applications which are stored on the mobile device.

The mobile device 100 includes all of the components discussed above with reference to FIG. 1, or a subset of those components. The mobile device 100 includes a housing 104 which houses at least some of the components discussed above with reference to FIG. 1.

In the embodiment, the mobile device includes a display 204, which may be a touchscreen which acts as an input interface 206. The display 204 is disposed within the mobile device 100 so that it is viewable at a front side 102 of the mobile device 100. That is, a viewable side of the display 204 is disposed on the front side 102 of the electronic device. In the embodiment illustrated, the display 204 is framed by the housing 104.

The mobile device 100 also includes other input interfaces 206 such as one or more buttons, keys or navigational input mechanisms. In the embodiment illustrated, at least some of these additional input interfaces 206 are disposed for actuation at a front side 102 of the mobile device.

The mobile device may also include a speaker 256. In the embodiment illustrated, the mobile device includes a single speaker 256 which is disposed vertically above the display 204 when the mobile device 100 is held in a portrait orientation where its height is longer than its width. The speaker 256 may be disposed on the front face of the mobile device 100.

While the mobile device 100 of FIG. 2 includes a single speaker 256, in other embodiments, the mobile device 100 may include a greater number of speakers 256. For example, in at least some embodiments, the mobile device 100 may include a second speaker 256 which is disposed vertically below the display 204 when the mobile device is held in a portrait orientation where its height is longer than its width (i.e. the orientation illustrated in FIG. 2).

The mobile device 100 also includes a microphone 258. In the embodiment illustrated, the microphone 258 is vertically disposed below the display 204 when the mobile device is held in the portrait orientation. The microphone 258 and at least one speaker 256 may be arranged so that the microphone is in close proximity to a user's mouth and the speaker 256 is in close proximity to a user's ear when the user holds the phone to their face to converse on the mobile device.

The mobile device 100 also includes a front facing camera 253 which may be located vertically above the display 204 when the mobile device 100 is held in a portrait orientation where its height is longer than its width. The front facing camera 253 is located so that it may capture images of objects which are located in front of or surrounding the front side of the mobile device 100.

The mobile device 100 also includes an electromagnetic radiation source 257. The electromagnetic radiation source 257 is disposed on the front side 102 of the mobile device 100. In this orientation, electromagnetic radiation which is produced by the electromagnetic radiation source 257 may be projected onto objects which are located in front of or surrounding the front side of the mobile device 100. Such electromagnetic radiation (or the projection of electromagnetic radiation onto objects) may be captured on images detected by the camera 253.

Figure 3:
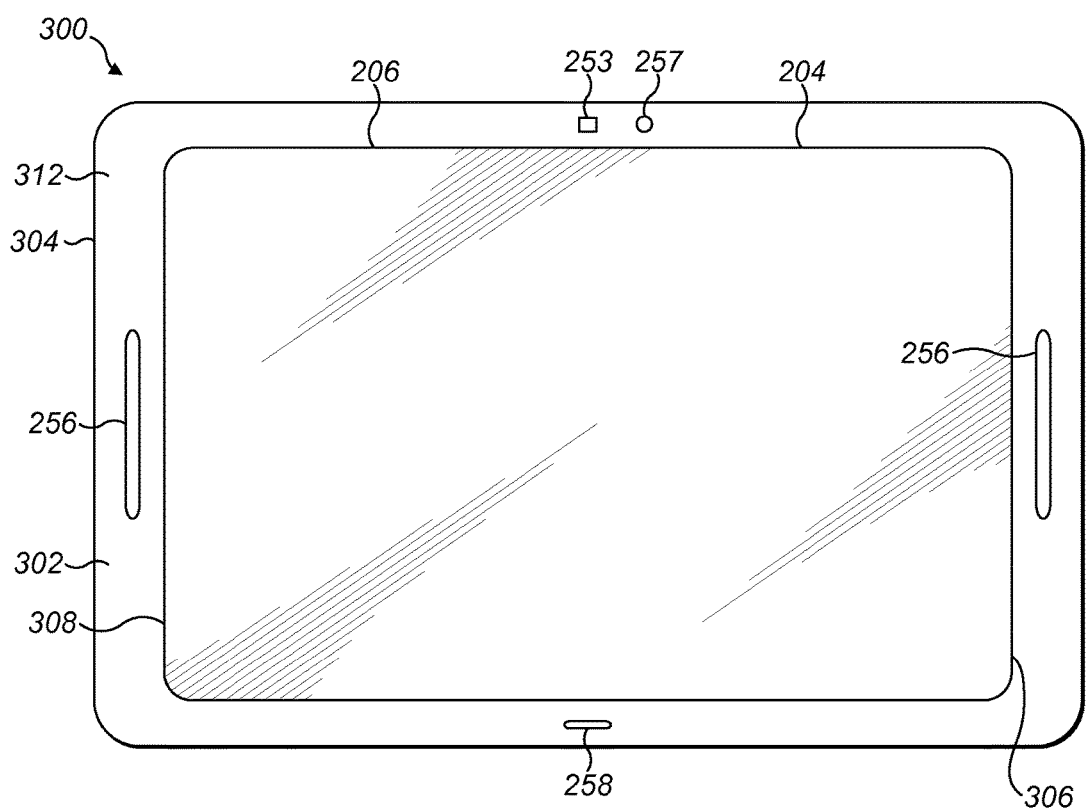
FIG. 3 is a plan view of the upper external side of one alternative electronic device usable by an end-user in some embodiments.

Referring now to FIG. 3, a front view of an example electronic device 201, which in one embodiment may be a tablet computer 300, is illustrated. The tablet computer 300 may be any other form of electronic device and includes mobile devices, laptop computers, personal computers or a desk top computer. The tablet computer or electronic device 300 may include the components discussed above with reference to FIG. 1 or a subset of those components. The electronic device 300 includes a housing 304 which houses at least some of the components discussed above with reference to FIG. 1.

The electronic device 300 includes a display 204, which may be a touchscreen which acts as an input interface 206. The display 204 is disposed within the electronic device 300 so that it is viewable at a front side 302 of the electronic device 300. That is, a viewable side of the display 204 is disposed on the front side 302 of the electronic device 300. In the embodiment illustrated, the display 204 is framed by the housing 304.

A frame 312 surrounds the display 204. The frame 312 is portion of the housing 304 which provides a border around the display 204. In at least some embodiments, the frame 312 is an active frame 312. That is, the frame has a touch sensitive overlay which allows the electronic device 201 to detect a touch applied to the frame thus allowing the frame 312 to act as an input interface 206 (FIG. 1).

The electronic device 300 includes a plurality of speakers 256. In the embodiment illustrated, the tablet includes two speakers 256. The two speakers 256 are disposed on opposing sides of the display 204. More particularly, when the electronic device 300 is held in a landscape orientation (such as the orientation illustrated in FIG. 3) where its width is longer than its height, one of the two speakers is disposed on a right side 306 of the display 204 and one of the speakers is disposed on the left side 308 of the display 204.

Both speakers 256 are disposed on the front side 302 of the electronic device 300.

The electronic device 300 also includes a microphone 258. In the embodiment illustrated, the microphone 258 is vertically disposed below the display 204 when the electronic device is held in the landscape orientation illustrated in FIG. 3. The microphone 258 may be located in other locations in other embodiments.

The electronic device 300 also includes a front facing camera 253 which may be located vertically above the display 204 when the electronic device 300 is held in a landscape orientation (i.e. the orientation of FIG. 3). The front facing camera 253 is located so that it may capture images of objects which are located in front of or surrounding the front side of the electronic device 300.

The example electronic device 300 also includes an electromagnetic radiation source 257. The electromagnetic radiation source 257 is disposed on the front side 304 of the electronic device 300. In this orientation, electromagnetic radiation which is produced by the electromagnetic radiation source 257 may be projected onto objects which are located in front of or surrounding the front side 302 of the electronic device 300. Such electromagnetic radiation (or the projection of electromagnetic radiation onto objects) may be captured on images detected by the camera 253.

The electronic device 300 may have the ability to run third party applications which are stored on the electronic device.

The electronic device 201, which may be tablet computer or other mobile device 300, is usable by an end-user to send and receive communications using electronic communication services supported by a service provider.

The end-user of an electronic device 201 may send and receive communications with different entities using different electronic communication services. Those services may or may not be accessible using one or more particular electronic devices. For example, a communication source of an end-user's text messages sent and received by an end-user using a particular electronic device 201 having a particular memory module 230, such as a USIM, may be accessible using that device 201, but those text messages may not be accessible using another device having a different memory module. Other electronic communication sources, such as a web-based email account, may be accessible via a web-site using a browser on any internet-enabled electronic device.

Figure 4:
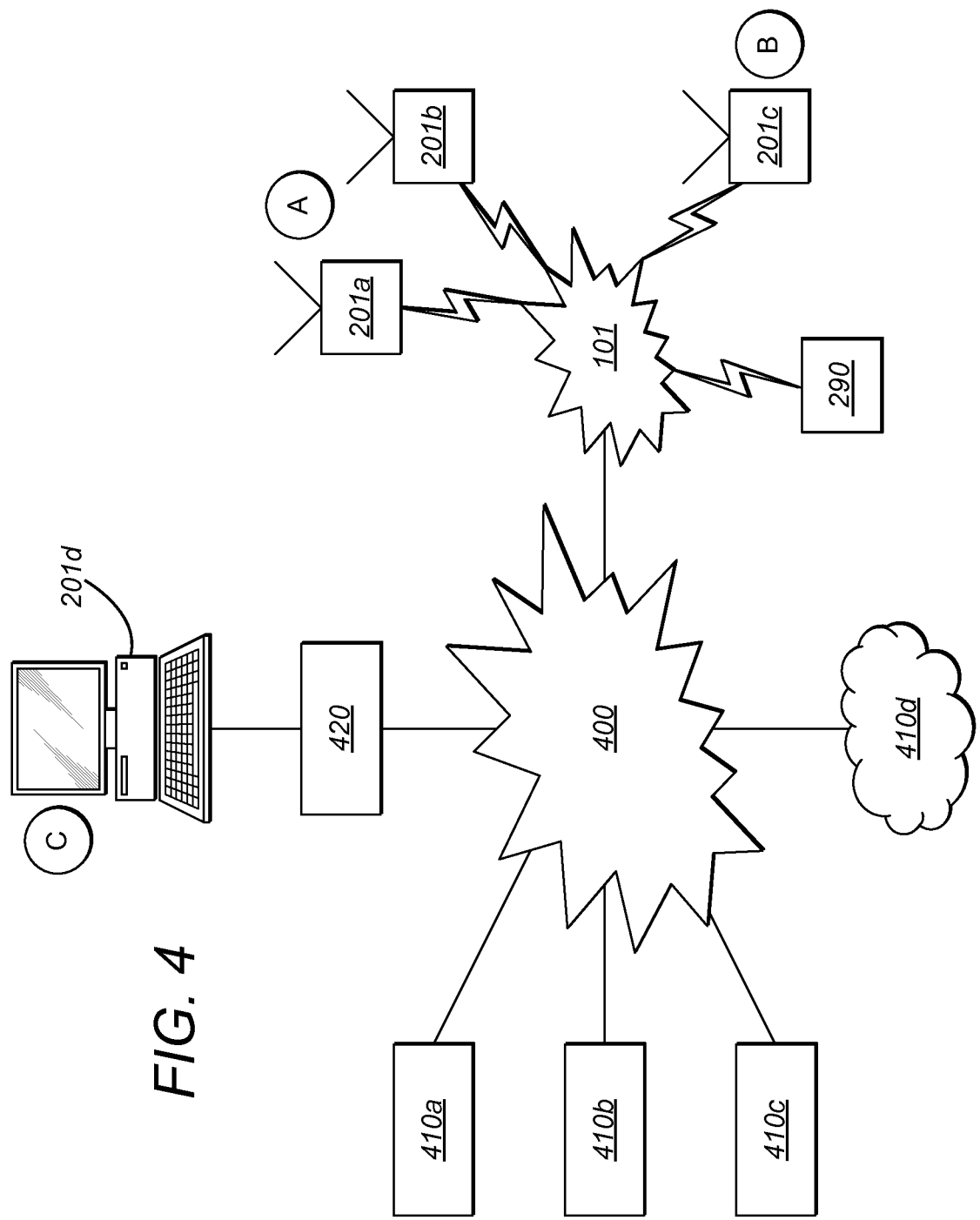
FIG. 4 is a schematic diagram of a system in which the aforementioned electronic devices can be employed in some embodiments.

FIG. 4 shows a system of networked apparatus by which electronic communications can be sent and received using multiple electronic devices 201a, 201b, 201c. Referring to FIG. 4, electronic devices 201a, 201b and 201c are connected to wireless network 101 to perform voice and data communications, and to transmit data to an external display device 290 residing on the wireless network. Wireless network 101 is also connected to the communications network 400, e.g. Internet. Electronic device 201a may be a tablet computer similar to tablet computer 300 described in FIG. 2 above. Electronic devices 201b and 201c may be smartphones. Electronic device 201d is a computing device such as a notebook, laptop or desktop, which is connected by a wired broadband connection to Local Area Network 420, and which is also connected to the communications network 400. Electronic devices 201a, b, c, d may access the communications network 400 to perform data communications therewith.

Servers 410a, 410b, 410c and 410d are also connected to the communications network 400 and one or more of them may individually or together support electronic communications services available to end-users of electronic devices 201a, 201b, 201c and 201d, enabling them to send and receive electronic communications. Servers 410a, 410b, 410c and 410d may be web servers or communications servers, such as email servers.

Other servers and services may of course be provided allowing users of electronic devices 201a, 201b, 201c and 201d to send and receive electronic communications by, for example, Voice over IP phone calls, video IP calls, video chat, group video chat, blogs, file transfers, instant messaging, and feeds.

Wireless network 101 may also support electronic communications without using communications network 400. For example, a user of smart phone 201b may use wireless network 101 to make telephony calls, video calls, send text messages, send multimedia messages, and send instant messages to smart phone 201c, and to display application data on a display screen of the external display device 290, or control the display of application data.

The embodiment shown in FIG. 4 is intended to be non-limiting and additional network infrastructure may of course be provided, such as a Public Switched Telephone Network (not shown), which may be used, for example, to make telephony calls using smartphone 201b to a wired phone (not shown).

In order to explain certain example modes of operation, reference is made below to FIGS. 5 to 8.

Figure 5:
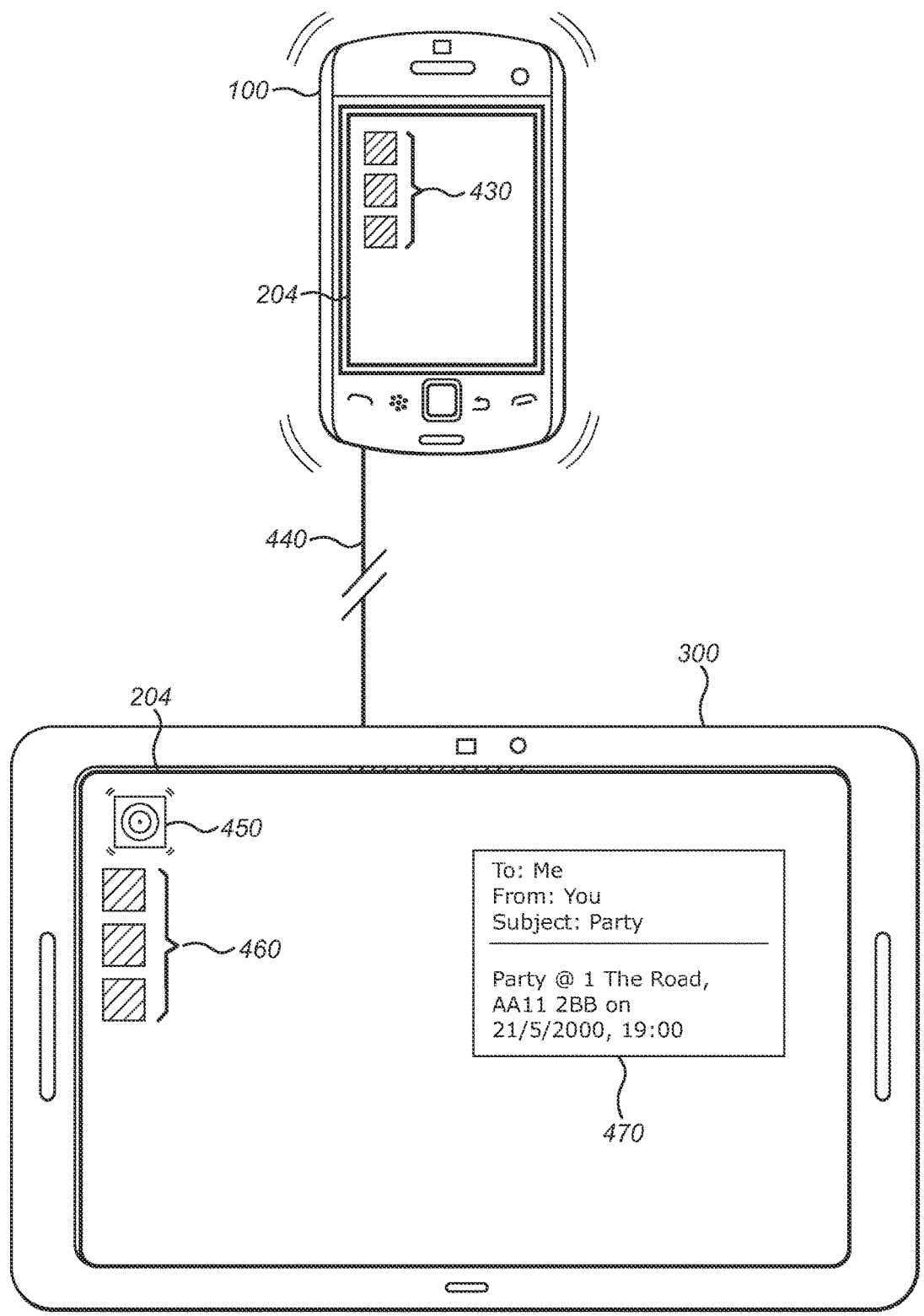
FIG. 5 illustrates the two devices illustrated in FIGS. 2 and 3 in communication with one another.

FIG. 5 illustrates the electronic device 100 and electronic device 300 illustrated in FIGS. 2 and 3 respectively. The electronic device 100 may be a smartphone, and will be referred to as the first electronic device 100. The second device 300 may be a tablet device, and will be referred to herein as the second device 300, but may be any one of the other electronic devices discussed above. The device 100 is illustrated with a number of selectable display objects 430 that are generated and output by the processor 240 to the display screen 204 of the device 100. The display objects 430 are included to illustrate that the first device 100 is currently on a home or desktop screen. The first device 100 or the second device 300 may be referred to as a remote device to the extent that it is a separate device from the other device.

The second device 300 illustrated in the figure is in communication with the device 100 via the connection 440. The connection could be a wired or wireless connection, as discussed above. For the purposes of this description, it is assumed that the connection has already been established. The display 204 of the second device 300 has displayed thereon a number of selectable display objects 460 for launching or executing one or more applications or components executable on the device 300 that may be representative of an application or component stored in the memory (flash memory 244) or installed on the second device 300. A further display object 450 is illustrated in the figure as an object displayed on the display 204 of the second device 300. The display object 450 represents a drop target for allowing a user to copy data more easily between the first and second devices 100, 300. The phrase drop target is used herein to describe a visual icon or object that provides a user with a target position to which to move data to for copying and may be referred to as a drop target, a drop icon, an icon or a target. The drop target 450 is illustrated as a display object such that if a user moves data to the location of the drop target the data are copied to the first device 100 as discussed below. The drop target may include an indication that it is linked to the first device 100, for example, the target 450 may include a visual representative of the first device 100 or text label, for example. The drop target may also take the form of the perimeter of the display 204 of the device 300 or a portion thereof. For example, if data are moved or applied to the left hand edge of the display 204 by a user, the data are copied to the first device 100.

To generate the drop target 450, and subsequently copy data to the device 100, the processor 240 of the device 100, in this example, outputs data to the processor 240 of the device 300. The data may contain an application, which when launched or executed by the processor 240 of the second device 300 causes the drop target icon 450 to be displayed. Alternatively, the application may already exist on the second device 300, stored in memory 244 for example, and may be executed when receiving data from the first device 100 to launch the drop target application stored thereon. The data sent from the first device 100 containing the application for the drop target or to launch such an application, may be in response to the connection being established between the first and second devices 100, 300. Alternatively, and as illustrated in the figure, a gesture may be used to output data from the first device 100 to the second device 300 to execute the drop target application. In this example, the gesture involves the user shaking or moving the first device 100 from side-to-side, but may include one or more of the other gestures described above.

The drop target application may be executed on either device 100, 300 in response to one of the selectable display objects 430, 460 be selected. It will be appreciated that typically both devices 100, 300 will have a drop target application running or executable to enable data to be transferred between the two devices. Furthermore, typically the first device 100, which in this example is the device receiving the copied data will already have an active application which may be active or launched on its processor 240 to allow the data to be received. In the example described above, it is the first device 100 that causes the drop target application to be launched on the processor 240 of the second device 300, however, it will be appreciated that a user may launch the drop target application from the second device 300, causing the processor 240 of the second device 300 to output data to the first device 100 to launch a drop target application to receive copied data. Of course, as described above data from the second device 300 may include the executable code for the application or data to launch an application already stored in memory (memory 244) of device 100.

For the purposes of explanation, an opened message 470 is illustrated as being displayed on the second device 300. The open message 470 is representative of any textual window or display that may be displayed, and that contains characters (e.g., ASCII), plain text, rich text, symbols, numerals, strings or data that may be highlight or selected by a user. It will be appreciated that this is not an exhaustive list and other forms of selectable characters are envisaged as falling within the scope of embodiments of the invention. This non-exhaustive list of possible displayed, selectable, objects will be referred to herein as character data or a character string. The terms character data or character string refer to one or more characters of a component. The component includes one or more of a file, display or other application that may be running and includes selectable characters. For example, the component may be, for example, an open website, an open word processor file, or a new, not yet saved, document. Examples of applications and associated data are described above.

The opened message 470 illustrated in the figure includes multiple text fields and includes text and characters. In this example, the message 470 is representative of a message informing the recipient that there is a party to be held at 1 The Road, AA11 2BB, on 21/05/2000 at 19:00. Each of the pieces of information in the message, including the recipient and the sender may be copied by the user and used within one or more applications.

Figure 6:
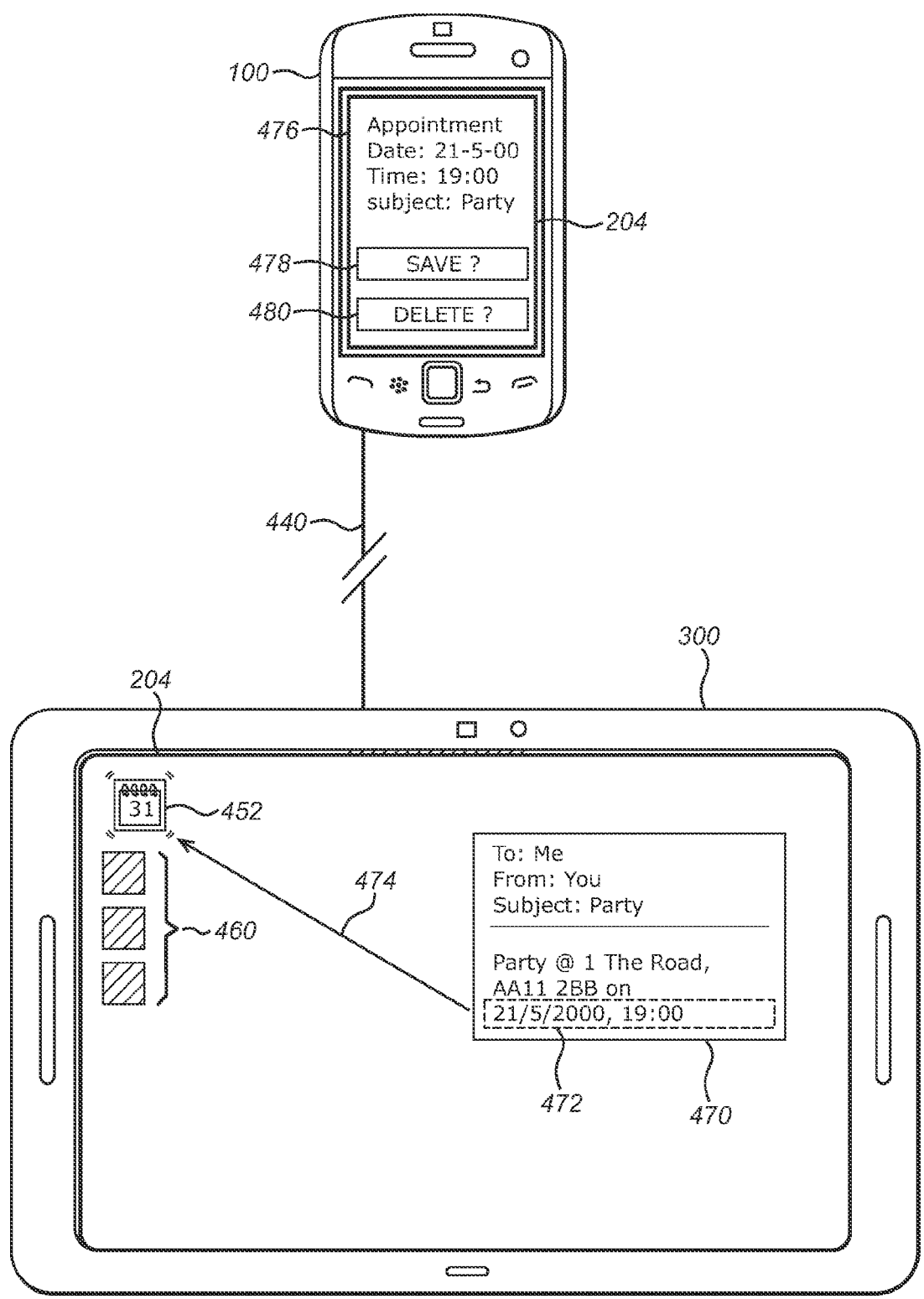
FIG. 6 illustrates the two devices illustrated in FIGS. 2 and 3 in communication with one another to demonstrate character data being transferred between the two devices in accordance with a first embodiment.

FIG. 6 illustrate the first and second devices 100, 300 illustrated in FIG. 5, and is used to illustrate how character data or character strings are selected from the message 470 and used by the first device 100, according to a first embodiment. Like features are illustrated in FIGS. 5 and 6 using the same reference numerals.

In the figure, a user may select any of the text or characters illustrated in the message 470. For example, the user may select the address of the party, the date/time of the party or the sender details. In this example, a user selects the date and time information 472. The date and time data 472 are illustrated as being selected by a dotted-line box surrounding the time and date in the message 470. The selection of characters in the message is performed as is known in the art by highlight the desired characters or text using a cursor displayed on the display 204 and controlled using the touchscreen. In this example, when a user selects the desired text, the selected text is stored in a clipboard associated with the drop target application running on the processor 240 of the second device 300. The clipboard data may be stored in memory 244 for example. Once a user selects the desired character string or data, the user moves or drags the selected desired character string 472 to the drop target 452, as illustrated by the arrow 474. It will be appreciated that a copy of the desired character string or data is saved in a clipboard in memory 244, for example, such that the selected text is not removed or deleted from the message 470.

Once a user has selected a character string or data (time and date of a party in this example), the user drags the selected string to the drop target. This is performed as is known in the art. For example, once a user has highlighted the character string 472, the user selects the highlighted string 472, by using an appropriate input selection, e.g., making contact the touchscreen 204 and moving or dragging 474 the highlighted string 472 to the drop target 452. It will be appreciated that as the highlighted string is dragged to the drop target 452 the user may be provided with, by the drop target application running on the processor 240 of the second device 300, an icon to illustrate that a string is being dragged. For example the cursor may be displayed as the selected character string or may be a box or other shape. The selection and dragging of a character string to a drop target may be performed by an application already running on the processor 240 of the device 300 that is not the drop target application.

As illustrated in the figure the appearance of the drop target 452 is different than the drop target 450 illustrated in FIG. 5. This is because the drop target has changed appearance according to the type of information contained in the character string 472. In this example, when the processor 240 of the second device 300 receives data that a selected string has been moved to the drop target, from the drop target application for example, the drop target application outputs character data to the processor 240 of the first device 100 based on the selected character string. The character data output to the device 100 may be the selected characters as plain text or may be data on the characters. In response to the data output to the first device 100, the processor 240 of the second device 300 receives data associated with the drop target appearance. The received data may include display data which when rendered by the processor 240 of the second device 300 causes the appearance of the drop target to be changed. Alternatively, the received data may comprise an indication to alter the appearance of the drop target. For example, the drop target application running on the processor 240 of the second device 300 may include multiple display icons that may be used depending on the application or component that the selected character string will be copied to and the indication received from the first device 100 includes an indication regarding which display icon should be used. In this example, the indication or display data received from the processor 240 of the first device 100 relates to a calendar or appointment application.

In the example described above the appearance of the drop target changes once the selected character string 472 is moved to the drop target 452. It will be appreciated that the appearance of the drop target may not change or the appearance of the drop target may be changed at a different point in time. For example, once a user selects a character string, e.g., character string 472, and begins to move the selected string 472 away from the message window 470, and optionally toward the drop target, the processor 240 of the second device 300 receives data that a selected string has been selected and is being moved, from the drop target application for example, the drop target application outputs character data to the processor 240 of the first device 100. It will be appreciated that when the character string is "moved" away from the message window 470, a copy of the selected character string is saved or stored in a clipboard, as described above, such that the source of the text or characters in the message window do not change in appearance, In response to the data output to the first device 100, the processor 240 of the second device 300 receives data associated with the drop target appearance so that the appearance of the drop target can be updated before the selected character string 472 is moved to the drop target. In an alternative embodiment, once a character string is selected, from message window 470 for example, the processor 240 of the second device 300 receives data that a character string has been selected, and outputs character data to the processor 240 of the first device 100. In response to the data output to the first device 100, the processor 240 of the second device 300 receives data associated with the drop target appearance so that the appearance of the drop target can be updated when a character string is selected. In a further example, the appearance of the drop target 452 is changed when a user moves a selected character string to within a predetermined distance of the drop target, for example, 0.5 cm, 1 cm, 2 cm, 3 cm, 4 cm, 5 cm, 6 cm, 7 cm, 8 cm, 9 cm, or 10 cm, but embodiments are not limited to these examples. When the highlighted string is dragged over any of the potentially many drop target icons, more information about that icon can be shown either on the display 204 of the first device 100 or the second device 300. This information can be text, images or animations showing users the function of the currently targeted icon and what will happen if the highlighted string is dropped on that particular drop target icon. In addition to providing information to the user, the size of the drop target may also be altered (e.g., increased) according to the data associated with the drop target so that the user can more easily move or apply the selected character to the target. Furthermore, the further information may be displayed as an additional icon, image or text (i.e., a display object), adjacent to or within a predetermined distance of the drop target. For example, data pertaining to more information, e.g., text, image or animation, is transmitted from the processor 240 of the first device 100 to the processor 240 of the second device 300 in response to receiving data from the processor 240 of the second device 300 that a drop target is targeted by a user by moving a displayed cursor representing the movement of the character string to the location of the selected drop target, but does not release the string. The processor 240 of the first or second device 100, 300 generates a display based on the received data. It will be appreciated that in the example where more information is provided at the first device 100, the data generated by the processor 204 of the first device 100 generates a display on the display 204 of the first device 100. Accordingly, targets or drop targets can be provided with a low amount of information to reduce the amount of information displayed, until a target is targeted.

Once a user has moved the selected character string 472 to the drop target 452, the user releases the selected character string 472. For example, the user may release the character string 472 by releasing his contact with the touch screen. Similarly if a input device is used that comprises a push bottom, the push button may be pressed and held to select the character string 472 and move the string to the drop target where the user releases the push button thus indicating that the character string 472 is to be copied to the first device 100. It will be appreciated that the actions of selecting a character string, moving the character string to a drop target and releasing the character string at the drop target may be referred to collectively as applying or supplying the character string or data to the drop target.

In the example where the appearance of the drop target is changed, if a selected string of characters is not moved to the location of the drop target, the appearance will not be changed or will be changed back to its original appearance.

When a user releases or supplies the selected character string 472 to the drop target 452, the character data or string 472 is copied to the processor 240 of the first device 100. The processor 240 of the second device 300 will copy the character string 472 to the processor 240 of the first device 100 from the clipboard where it is stored in memory 244.

The above example uses a drag and drop technique to supply a character string to the drop target 450, 452. However it will be appreciated that a cut or copy and paste technique could equally be used. For example, a user highlights a character string and selects copy from a menu, as in known in the art, or uses known hot-keys, e.g., "ctrl-Fc". Similarly, a user may highlight a character string and select cut from a menu, as in known in the art, or uses known hot-keys, e.g., "ctrl-Fx". In an example where a user "cuts" a character string it will be appreciated that this may result in the characters being removed or deleted from the display. Once a character string is copied, the user moves a cursor to the position of the drop target or touches the touch screen of the display 204 at the location of the drop target and selects paste from a menu, as in known in the art, or uses known hot-keys, e.g., "ctrl+v.

The operation of the first device 100, in response to character data received from the processor 240 of the second device 300, is now described.

The processor 240 of the first device 100 may receive data related to or associated with the selected character string 472 prior to character data being copied to the processor 240 of the first device 100. In this example, the data may contain the character data or may contain data on the character data or metadata. The metadata may include an indication regarding the form of the character string, for example, if the character string contains numerals, and if it follows a known format, such as a zip or post code. Furthermore, the meta data may include an indication what the character string is or is most likely to be, for example, an address (postal or email), a name, a date, a time, or a URL. It will be appreciated that this is a non-exhaustive list and the character string may be determined by the processor 240 of the second device 300 to be any other form of character string. The processor 240 of the second device 300 may determine the type of the character string by comparing the character string to one or more stored templates, and outputting the most likely character string type. For example, individual characters within the character string may be compared with known formats. In a further example, the determination of the type of the character string is performed by the processor 240 of the first device 100, and the character string is output to the first device 100, before the string is moved to the drop target, to allow such a determination to be made.

The processor 240 of the first device 100, after receiving the metadata indicating the type of the character string, outputs to the processor 240 of the second device 300 data relating to the appearance of the drop target 450, 452, as described above. In the example described above the selected character string 472 is a date and time, such that the type of the character string is determined to be an entry suitable for a calendar application or component or similar, in which date ("21/5/2000") and time ("19:00") information may be organised. Accordingly, in this example, the processor 240 of the first device 100 outputs a data indication or display data to change the appearance of the drop target 450, 452 to an image indicative of a calendar or organizer.

The processor 240 of the first device 100 receives the character string 472 after a user has applied the character string 472 to the drop target 452. In this example the processor has previously received an indication that the character string is suitable for a calendar application. Thus when the processor 240 of the first device 100 receives or is supplied with the character string 472, the processor 240 launches or executes code of a calendar or organizer application 476, as illustrated in FIG. 6, under the control of the drop target application also running on the processor 240 of the first device 100. The character string from the processor 240 of the second device is supplied to the organizer application to populate or complete one or more fields therein. In this example, the date and time fields have been populated using data from the character string. The user may enter further details, e.g., enter party for the subject entry and be prompted to save 478 or delete 480 the entry. It will be appreciated that in other examples, the entry will be stored for access by the organizer application without prompting the user. That is to say that an entry based on the received character data is stored for access by the organizer application without intervention from a user. In such an application, any incomplete fields may be left empty or populated with default data. Furthermore, it will be appreciated that if a calendar application is already running on the processor 240 of the first device 100 when the character data are received, it is not necessary to launch a new instance of the application, rather utilise the already active application.

The term application is used herein to describe an executable program stored in memory (e.g., persistent memory 244) on either the first device 100 or the second device 300 and may also be referred to as a component, where a component may be an element or portion of an application executable on the respective processor 240 of the first device 100 or the second device 300.

Accordingly, a user is able to more easily copy content (e.g., character strings or text) from one device to another with fewer steps.

Figure 7:
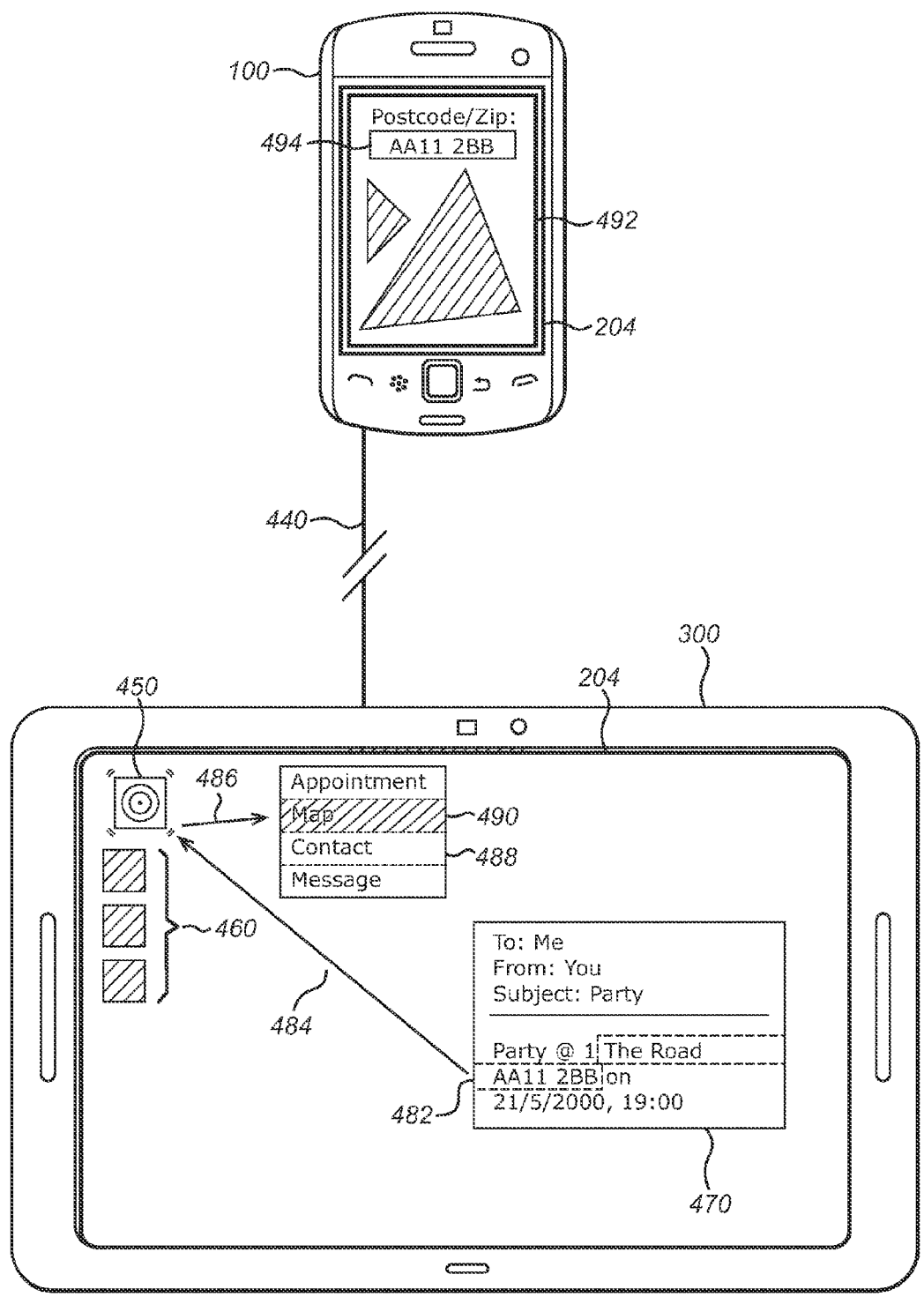
FIG. 7 illustrates the two devices illustrated in FIGS. 2 and 3 in communication with one another to demonstrate character data being transferred between the two devices in accordance with a second embodiment.

FIG. 7 illustrates the first and second devices 100, 300 illustrated in FIG. 5, which is used to illustrate how character data or character strings are selected from a message 470 and used by the first device 100, where there are different possible applications or components that may utilise character data of character strings.

Referring to FIG. 7, a user selects a portion of the characters or text displayed in the message 470. In this example, the address is selected from the message, i.e., the character string 482 "1The Road, AA11 2BB" is selected by a user by highlighting the desired character string or text using, for example, the touch screen 204. Once the desired character string 482 is selected the user moves or drags, as indicated by arrow 484, the string to the drop target 450 as described above in association with FIG. 6. In this example, when the selected character string is moved or supplied to the location of the drop target 450, metadata relating to the character string is output to the processor 240 of the first device 100 by the processor 240 of the second device 300 using the active drop target application. As described above, the meta data may include the plain text included in the character string or may include an indication of the type of the character string.

In this example, upon receipt of the data relating to the character string, the processor 240 of the first device 100 determines that more than one application or component may be suitable to receive or handle the selected character string. For example, since the character string contains an address it may be used in a map application, a contacts application, a calendar application for updating details of an appointment, or a message to send a response, for example. Accordingly, in this example once the character string 482 is moved 484 to the location of the drop target 450, the processor 240 of the first device 100 provides information of selectable applications or components in response to receiving data relating to the character string 482 from the processor 240 of the second device 300. For example, the information of selectable applications or components, may be a list or grid and may further be provide by graphics, e.g. icons, text or both.

The processor 240 of the second device 300 generates display based on the received data, which in this example is in the form of a selectable list 488. The data received for generating the selectable information may be a list in plain text of the possible applications so that the processor 240 of the second device 300 generates the display, or may be code which when rendered or executed by the processor 240 of the second device 300 generates the display. In the example, the information of applications 488 comprises types of possible applications and includes appointment, map, contact and message.

When the information is displayed the user is able to continue moving the selected character string to one of the selectable information items, as illustrated by the arrow 486. In this example, the "map" entry 490 is selected by the user by moving the character string to the location of the map entry, which is highlighted in the figure to illustrate that it has been selected. The processor 240 of the second device 300 receives such a selection when, for example, the user removes or withdraws his contact with the touch screen, thus releasing the selected character string at a desired application type. Once a selection from the information has been made, the drop target application running on the processor 240 of the second device 300 causes the character data of the character string 482, along with the selected application type (i.e., map application) to be output to the processor 240 of the first device 100. A temporary window displaying more information about the currently targeted drop target can be provided either on the display 204 of device 100 or 300 as the highlighted string is held above a drop target, before is it dropped or released. For example, data pertaining to more information, e.g., text, image or animation, is transmitted from the processor 240 of the first device 100 to the processor 240 of the second device 300 in response to receiving data from the processor 240 of the second device 300 that a selection of one of the listed items is made by a user by moving a displayed cursor representing the movement of the character string to the location of the selected listed item, but does not release the string. The processor 240 of the first or second device 100, 300 generates a display based on the received data. It will be appreciated that in the example where more information is provided at the first device 100, the data generated by the processors 204 of the first device 100 is used to generate a display on the display 204 of the first device 100.

The processor 240 of the first device 100 receives the character data and application type data, and launches and displays, on the display 204, the appropriate map application or component 492, as illustrated in the figure. A portion of the character data, i.e., the postcode/zip, has been entered in the corresponding field 494 of the map application such that the map application will find the location corresponding to the entered data. It will be appreciated that all of the text of the character data may be entered into the field 494. Furthermore, the user may be prompted to initiate the search for the entered data or the application may perform the search without bring prompted such that the user is simply presented with the search result.

In a further example, the user may select a different entry from displayed selectable information, for example "contact". If the user selects such an example, the processor 240 of the first device 100, upon receipt of character data, may simply add the data to an existing contact or create a new contact, without displaying the contact data. However, in either case, a message may be displayed on the first device 100 or the second device 300, or both to indicate that the copy task is complete. Such a message is generated by the processor 240 of the first device 100.

The selectable information 488 illustrated in FIG. 7 may be prioritised by the processor 240 of either the first device 100 or the second device 300. That is to say that the order of the items in the selectable list may be determined by the processor 240 of the first device 100 when the information is generated or the list of items may be output to the processor 240 of the second device 300 in a random order and the processor 240 of the second device 300 will order the items. The ordering of the information is performed based on characters contained in the character data. For example, the processor 240 of the first device 100 may compare the characters or portion thereof contained in the character data with known formats to determine the format of the characters in the character data. Once the format of the characters is determined, the processor 240 of the first device determines which applications are suitable for the characters, which may be taken from predetermined information from memory, e.g., memory 244. For example, if the character data contains an address or part thereof, the character data type is determined to be an address and all the names of the applications that are able to handle an address are taken from the predetermined list. The ordering of the information may be predefined or may be actively determined based on, for example, recently used applications or frequency of use of the possible applications.

In the example illustrated in FIG. 7, only a single list is provided before a selection is made and an application on the first device 100 is launched. However, if the "contact" entry in the selectable list is selected by a user, a further list may be generated and displayed in a similar manner to that described above. For example, once a contact is selected, a new list containing the alphabet in groups is displayed, e.g., "A-C", "D-F", "G-I", "J-L", "M-O", "P-S", "T-V", and "W-Z". Once a user selects one of the groups a further list of the individual letters in the selected group is displayed and the process is repeated until the user finds the name or entry where the character string contained in the character data should be stored.

In the example described above, a list of selectable items is used but other known techniques for providing selectable items may be used. For example, a pie menu or display may be used where each selectable item is represented by a portion or segment of the pie menu. As in the list, if an application or component is more likely to be selected (i.e., it would appear at the top of an ordered list), it may be represented in a pie menu with a larger segment.

FIG. 8 is a flow chart depicting a method 500 performed by the processors 240 of a first device 100 and second device 300 for supplying character data or strings to an application or component on either device, as described in association with FIGS. 5 to 7. It will be appreciated that some of the steps may be optionally performed and the method will be split between two devices, such that the second device 300 may perform the steps illustrated in blocks 502, 504, and 506 and the first device 100 may perform the steps illustrated in blocks 508 and 510.

At block 502, the processor 240 of the second device 300 receives a user selection of text or a character string from displayed text. The data associated with the character string may be referred to as character data and may contain a plain text version of the selected string and any formatting data. The selected data are stored within a clipboard in memory 244 of the second device 300 for example.

At block 504, the processor 240 of the second device 300 via a drop target application receives the character string when the user supplies the selected character string (or character data) to a displayed drop target. This may be achieved using a drag and drop technique or by copying and pasting the selected or highlighted character sting and pasting the string at the location of the drop target At block 506, the processor 240 of the second device outputs character data indicative of the selected character string to the processor 240 of the first device 100.

At block 508, the character data are received by the processor 240 of the first device 100.

At block 510, the processor 240 of the first device 100 determines the type of application suitable for the character data and supplies the character data to the determined application or component executable on the processor 240 of the first device 100.

FIG. 9 is a flow chart depicting a method 600 performed by the processors 240 of a first device 100 and second device 300 for generating and output data one or more components following a selection of character data, as described in association with FIGS. 5 to 7. It will be appreciated that some of the steps may be optionally performed and the method will be split between two devices, such that the second device 300 may perform the steps illustrated in blocks 602, and 604, and the first device 100 may perform the steps illustrated in blocks 606, 608 and 610.

At block 602, the processor 240 of the second device 300 receives data on a character string selection of text from displayed text. The selection of the character string includes for example, highlighting and copying the text. At this stage it is important to note that the user has only selected the character string but has not applied to a drop target, rather the user intends to apply the selection to the drop target.

At block 604, character data pertaining to or indicative of the selected character string is output to the first device 100. The data indicative of the character string may contain, for example, a plain text version of the selected string and any formatting data, but may only include an indication of the type of string, e.g., an address, telephone number, date etc. The selected data are stored within a clipboard in memory 244 of the second device 300, for example.

At block 606, the processor 240 of the first device received the character data from the processor 240 of the second device 300.

At block 608, the processor 240 of the first device makes a determination of one or more components executable on the processor for supplying the character data thereto. The determination is based on one or more characters in the character data. The one or more components are, for example, applications which are compatible with or are able to handle the character data, or are typically used to handle data such as that in the character data, as described in details above.

At block 610, the processor 240 of the first device 100 outputs the data on the one or more components to the second device 300. For example, the outputted data may comprise data pertaining to selectable information for generating a display of the information in a list or grid for user selection.

In an alternative embodiment, the term character string or character data includes characters taken from a file, for example. That is to say that a user could move or copy a selected file containing character data to a dropt target and one or more characters taken from the file are used to make a determination on the application or component for copying the character data thereto.

While the present application is primarily described in terms of device and methods (e.g., first and second devices 100, 300), the devices may include components for performing at least some of the example aspects and features of the described methods, be it by way of hardware components (such as the memory 244, 246, 248 and/or the processor 240), software or any combination of the two, or in any other manner. Moreover, an article of manufacture for use with the apparatus, such as a pre-recorded storage device or other similar computer readable medium including program instructions recorded thereon may direct the apparatus to facilitate the practice of the described methods. It should be understood that such apparatus and articles of manufacture come within the scope of the present application.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

It will be appreciated that the foregoing discussion relates to particular embodiments. However, in other embodiments, various aspects and examples may be combined.

The invention claimed is:
1. A device comprising:
 a processor configured to communicate with a remote device, the processor being further configured to:
  present, on a display of the device, data associated with one or more items presented on the remote device;

receive character data from the remote device in response to a user moving the character data onto a target object displayed on the remote device; and in response to receiving the character data,
transmit a set of data to the remote device comprising instructions to change an appearance of the target object based on the character data, wherein the instructions are generated without a user of the device making a change to an object on the device corresponding to the target object.

2. The device of claim 1, wherein the processor is configured to identify a component compatible with the character data based on the characters in the character data and to supply the character data to the identified component.

3. The device of claim 1 wherein the processor is configured to generate a prompt to update the appearance of the target based on characters in the character data.

4. The device of claim 1, wherein the processor is configured to generate a prompt to update the appearance of the target based on the one component.

5. The device of claim 1, wherein the processor is configured to identify one or more components compatible with the character data based on the characters in the character data and to generate a selectable list of components for display on the remote device.

6. The device of claim 5, wherein the processor is configured to receive a user selection based on the generated list and to supply the character data to the selected component.

7. The device of claim 5, wherein the processor is configured to prioritise the list of components based on one or more characters in the character data.

8. The device of claim 1, wherein the processor is configured to launch a component upon receipt of the character data.

9. The device of claim 1, wherein the character data comprises one or more of a date, an address, an email address, a URL, a contact, contact details and plain text.

10. The device of claim 1, wherein the processor is configured to output data to the remote device for use in generating the target at the remote device.

11. The device of claim 10, wherein the processor is configured to generate the data in response to receiving a user gesture.

12. A device comprising:
a processor configured to communicate with a remote device, the processor being further configured to:
present a target object on a display;
receive character data in response to a user moving the character data onto the target object that has been presented;
output the character data to the remote device in response to receiving the character data, wherein the remote device presents data to a user via a display of the remote device that is associated with one or more items presented on the device; and
in response to outputting the character data to the remote device, receive a set of data from the remote device comprising instructions to change an appearance of the target object based on the character data, wherein the instructions are generated without a user of the remote device making a change to an object on the remote device corresponding to the target object.

13. The device of claim 12, wherein applying the character data to the target comprises copying and pasting the character data to the target.

14. The device of claim 12, wherein applying the character data to the target comprises dragging and dropping a selected character data to the target.

15. The device of claim 12, wherein the processor is configured to update the appearance of the target based on a prompt received from the remote device.

16. The device of claim 12, wherein the processor is configured to output the character data to the remote device in response to a user selecting the character data.

17. The device of claim 12, wherein the processor is configured to output the character data to the remote device in response to a user moving selected character data to within a predetermined distance of the target.

18. A method for a device in communication with a remote device, the method comprising:
presenting, on a display of the device, data associated with one or more items presented on the remote device;
receiving character data from the remote device in response to a user moving the character data onto a target object displayed on the remote device; and
in response to receiving the character data, transmitting a set of data to the remote device comprising instructions to change an appearance of the target object based on the character data, wherein the instructions are generated without a user of the device making a change to an object on the device corresponding to the target object.

19. The method of claim 18, further comprising identifying a component compatible with the character data based on the characters in the character data and supplying the character data to the identified component.

20. The method of claim 18, further comprising generating a prompt to update the appearance of the target based on characters in the character data.

21. The method of claim 18, further comprising generating a prompt to update the appearance of the target based on the one component.

22. The method of claim 18, further comprising identifying one or more components compatible with the character data based on the characters in the character data and generating a selectable list of components for display on the remote device.

23. The method of claim 22, further comprising receiving a user selection based on the generated list and to supply the character data to the selected component.

24. The method of claim 22, further comprising prioritising the list of components based on one or more characters in the character data.

25. The method of claim 18, comprising the step of launching a component upon receipt of the character data.

26. The method of claim 18, wherein the character data comprises one or more of a date, an address, an email address, a URL, a contact, contact details and plain text.

27. The method of claim 18, further comprising outputting data to the remote device for use in generating the target at the remote device.

28. The method of claim 27, further comprising generating the data in response to receiving a user gesture.

29. A method for a device in communication with a remote device, the method comprising:
presenting a target object on a display;
receiving character data in response to a user moving the character data onto the target object that has been presented;
outputting the character data to the remote device in response to receiving the character data, wherein the remote device presents data to a user via a display of the remote device that is associated with one or more items presented on the device; and in response to outputting the character data to the remote device, receiving a set of data from the remote device comprising instructions to change an appearance of the target object based on the character data, wherein the instructions are generated without a user of the remote device making a change to an object on the remote device corresponding to the target object.

30. The method of claim 29, wherein applying the character data to the target comprises copying and pasting the character data to the target.

31. The method of claim 29, wherein applying the character data to the target comprises dragging and dropping a selected character data to the target.

32. The method of any one of claim 29, further comprising updating the appearance of the target based on a prompt received from the remote device.

33. The method of claim 29, further comprising outputting the character data to the remote device in response to a user selecting the character data.

34. The method of claim 29, further comprising outputting the character data to the remote device in response to a user moving selected character data to within a predetermined distance of the target.

35. A non-transitory computer-readable medium comprising executable instructions which, when executed, cause a processor to perform a method comprising:

presenting, on a display of the device, data associated with one or more items presented on the remote device;

receiving character data from a remote device in response to a user moving the character data onto a target object displayed on the remote device; and in response to receiving the character data, transmitting a set of data to the remote device comprising instructions to change an appearance of the target object based on the character data, wherein the instructions are generated without a user of the device making a change to an object on the device corresponding to the target object.

36. A non-transitory computer-readable medium comprising executable instructions which, when executed, cause a processor to perform a method comprising:

presenting a target object on a display;

receiving character data in response to a user moving the character data onto the target object that has been presented; and outputting the character data to a remote device in response to receiving the character data, wherein the remote device presents data to a user via a display of the remote device that is associated with one or more items presented on the device; and in response to outputting the character data to the remote device, receiving a set of data from the remote device comprising instructions to change an appearance of the target object based on the character data, wherein the instructions are generated without a user of the remote device making a change to an object on the remote device corresponding to the target object.

37. A device comprising a processing circuit configured to perform a method comprising:

presenting, on a display of the device, data associated with one or more items presented on the remote device;

receiving a set of data from a remote device in response to a user moving character data on the remote device, wherein the set of data is different from the character data and indicates a type of the character data; and in response to receiving the data, transmitting a set of data to the remote device comprising instructions to change an appearance of a target object at the remote device onto which the character data is able to be placed based on the type of the character data indicated by the set of data.

38. A device comprising a processing circuit configured to perform a method comprising:

presenting a target object on a display;

receiving a set of data in response to a user moving character data, wherein the set of data is different from the character data and indicates a type of the character data;

outputting the a set of data to a remote device in response to receiving the a set of data, wherein the remote device presents data to a user via a display of the remote device that is associated with one or more items presented on the device; and in response to outputting the a set of data to the remote device, receiving instructions from the remote device to change an appearance of the target object based on the type of the character data indicated by the set of data.

* * * * *